(12) United States Patent
Okuwaki et al.

(10) Patent No.: US 6,795,157 B2
(45) Date of Patent: Sep. 21, 2004

(54) COMPOUND LIQUID CRYSTAL MICROLENS FOR A SENSOR

(75) Inventors: Daisaku Okuwaki, Yamanashi-ken (JP); Susumu Sato, Akita-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 0 days.

(21) Appl. No.: 10/234,706

(22) Filed: Sep. 5, 2002

(65) Prior Publication Data

US 2003/0048394 A1 Mar. 13, 2003

(30) Foreign Application Priority Data

Sep. 10, 2001 (JP) ........................................ 2001-272994

(51) Int. Cl.[7] ................................................. G02F 1/13
(52) U.S. Cl. ...................................................... 349/200
(58) Field of Search ......................................... 349/200

(56) References Cited

U.S. PATENT DOCUMENTS

| | | | | |
|---|---|---|---|---|
| 4,190,330 A | * | 2/1980 | Berreman | 349/200 |
| 4,572,616 A | * | 2/1986 | Kowel et al. | 349/200 |
| 5,150,234 A | * | 9/1992 | Takahashi et al. | 349/1 |
| 6,359,674 B1 | * | 3/2002 | Horiuchi | 349/200 |
| 6,462,794 B1 | * | 10/2002 | Yoshikawa et al. | 349/95 |

* cited by examiner

*Primary Examiner*—James A. Dudek
(74) *Attorney, Agent, or Firm*—Dennison, Schultz, Dougherty & MacDonald

(57) ABSTRACT

A first liquid crystal lens and a second liquid crystal lens are provided on both sides of an intermediate glass plate. The first liquid crystal lens is provided for forming an inverted image of an object, and the second liquid crystal lens is provided for inverting the inverted image, thereby forming an erecting image of the object.

2 Claims, 11 Drawing Sheets

ALIGNING DIRECTION →

CONSTANT OF REFRACTIVE INDEX

COMPOUND LIQUID CRYSTAL MICROLENS FOR A SENSOR

BACKGROUND OF THE INVENTION

The present invention relates to a liquid crystal microlens used as a means for forming an image in a lens array for a contact-type sensor for a scanner and facsimile machine.

There is commonly known a contact-type sensor having a construction such as that of FIGS. 14 and 15.

Referring to FIG. 14, a sensor 110 has a frame 108 in which are mounted a linear light-emitting element (LED) array 105, a rod lens array 106, and light-receiving element array 104. The light-receiving element array 104 comprises a substrate 103 formed at the bottom of the frame 108, a protection film 102 mounted on the substrate 103, and a sensor IC 101 comprising a plurality of photoelectric converters. A transparent plate 107 on which a text sheet 109 is set is mounted on the upper portion of the frame 108.

In operation, a light beam from the LED array 105 irradiates the text sheet 109. The light beams diffused and reflected at a particular reading line of the sheet 109 passes through the rod lens array 106 so as to form an image on the text upon the sensor IC of the light-receiving element array 104. Information regarding the shades of the text sheet conveyed by the reflected light, taking the form of the intensity of light, is converted into an electric signal by the sensor IC 101 and serially outputted in accordance with the scanning direction. After scanning one line in the scanning direction, the next line in the direction perpendicular to the scanning direction is scanned. By repeating the scanning operation, two-dimensional information on the text sheet 109 is converted into an electric signal in time sequence. FIG. 15 shows the arrangement of the rod lens array 106 of the contact-type sensor 110 shown in FIG. 14 and the operation thereof.

The principle and the construction of the rod lens array 1106 are described hereinafter with reference to FIGS. 16a to 16c. Each rod lens of the rod lens array 106 is a graded index lens, each having a refractive index distribution shown in FIG. 16a. FIG. 16b shows the transmission of a light beam through the rod lens.

In FIG. 16a, the distribution of the refractive index n can be approximately expressed as $$n = n_0 (1 - (A/2) r^2) \qquad (1)$$

where $n_0$ is the refractive index on the optical axis, r is the distance from the optical axis in a radial direction, and A is the constant of the refractive index. The light beams tend to travel slower in a range where the refractive index is large and faster where the refractive index is small.

Referring to FIG. 16b, in a graded index rod lens having the refractive index distribution of the equation (1) and a length Z, condition (r2, r'2) of an exiting light beam, condition (r1, r'1) of the incident light beam can be expressed as follows.

$$\begin{bmatrix} r2 \\ r'2 \end{bmatrix} = \begin{bmatrix} \cos\sqrt{A}\,Z + (\sin\sqrt{A}\,Z / n_0\sqrt{A}) \\ -n_0\sqrt{A}\,\sin(\sqrt{A}\,Z) + \cos(\sqrt{A}\,Z) \end{bmatrix} \begin{bmatrix} r1 \\ r'1 \end{bmatrix} \qquad (2)$$

The equation (2) means that despite of the difference of the incident position and the incident angle, each light source has the same winding interval ($P = 2\pi/\sqrt{A}$), and as shown in FIG. 16c, by setting an appropriate rod lens length $Z_0$ in relation to the winding interval, an erecting image Q" of an image Q equal in size thereto can be formed at the opposite side of the rod lens at a distance TC.

The reference $L_0$ in FIG. 16c is a working distance between the rod lens and the object Q (Q").

Thus, even if the end faces are flat, due to the distribution of the refractive index, the rod lens has a lens effect. Namely, the rod lens is provided with the following characteristics.

(1) An erecting image, the size of which is equal to that of the original object, is formed.

(2) The condition of the formed image can be changed dependent on the length of the rod lens, so that the width of the image can be rendered much larger than the diameter of the lens.

Therefore, as shown in FIG. 15, when a plurality of rod lenses are arranged adjacent the other, equal-sized erecting images formed by the rod lenses are overlapped, so that an image on the text sheet can be formed on the light-receiving array 104 without a gap.

Methods for imparting the refractive index distribution to a glass rod include ion implantation, molecular stuffing, and ion exchange method. In the case of rod lens, the ion exchange method is used so that the distribution becomes smooth and symmetrical.

Referring to FIG. 17, the ion exchange method employs a kiln 112 containing a fused salt 113 of high temperature. A glass rod 116 is immersed in the salt 113 so that an alkali ion A in the glass rod and an alkali ion B in the salt 113 are exchanged with each other. As a result, there is formed in the glass rod 116 an ion concentration distribution which is in proportion to the refractive index distribution described above.

However, the rod lens thus formed has the following problems.

(1) In order to manufacture the rod lens, there is a need to provide a device for the ion conversion treatment so that the manufacturing cost increases.

(2) The conjugation length TC, which is the distance between the original object and the image formed, can only be selected from the lineup of the rod lens products. Thus the distance TC cannot be shortened for manufacturing a thin contact-type sensor.

SUMMARY OF THE INVENTION

An object of the present invention is to provide a lens means for a contact-type sensor where the above problems are resolved so that inexpensive and thin contact-type sensor can be manufactured.

According to the present invention, there is provided a compound liquid crystal lens comprising a first liquid crystal lens for forming an inverted image of an object, a second liquid crystal lens for inverting the inverted image, thereby forming an erecting image of the object, a supporting member for supporting the first and second liquid crystal lenses in axial symmetry.

Each of the first and second liquid crystal lenses comprises a pair of spaced transparent substrates, a pair of electrodes disposed between the substrates, a liquid crystal material charged in a space between the electrodes, at least one electrode having circular holes, opposite circular holes of the first and second liquid crystal lenses being concentrically disposed.

The supporting member is a transparent glass plate.

In an aspect of the invention, each of the first and second liquid crystal lenses comprises a transparent substrate, a pair of electrodes disposed in a space between the substrate and the glass plate, a liquid crystal material charged in a space between the electrodes, both of the electrodes having opposite concentric circular holes, opposite circular holes of the first and second liquid crystal lenses being concentrically disposed.

These and other objects and features of the present invention will become more apparent from the following detailed description with reference to the accompanying drawings.

BRIEF DESCRIPTION OF DRAWINGS

FIG. 13b is a diagram showing an electric potential distribution in the liquid crystal cell of FIG. 13a;

DETAILED DESCRIPTION OF THE PREFERRED EMBODIMENT

First of all, a liquid crystal lens in general is explained. The construction and the features of the liquid crystal lens are described in a known publication OplusE., October, 1998, Vol. 20, No. 10, Kabushiki Kaisha Shingijutsu Communication, featuring liquid crystal optical elements and their applications: liquid crystal microlens. The summary of the article is described hereinafter.

In order to form an optical element which serves as a lens with a liquid crystal, a liquid crystal layer, which becomes a medium, may be shaped into lens as in glass lenses. Alternatively, the optical element may be constructed so that a spatial refractive index may be imparted. In a nematic liquid crystal cell, liquid crystal molecules are aligned in the direction of an electric field. Thus, due to the distribution effect of the liquid crystal molecules in the electric field which is symmetric with respect to the axis and inhomogeneous, a lens having a spatial refractive index distribution can be provided. Thus, also in the liquid crystal, which has a parallel planar construction, in the case where the refractive index is spatially distributed, incident light is effectively focused and diffused. More particularly, in the case where the refractive index has a second power characteristic, lens effect is achieved. The present invention relates to a lens constructed with the liquid crystal where such a spatial distribution of refractive index is provided.

Figure 1:
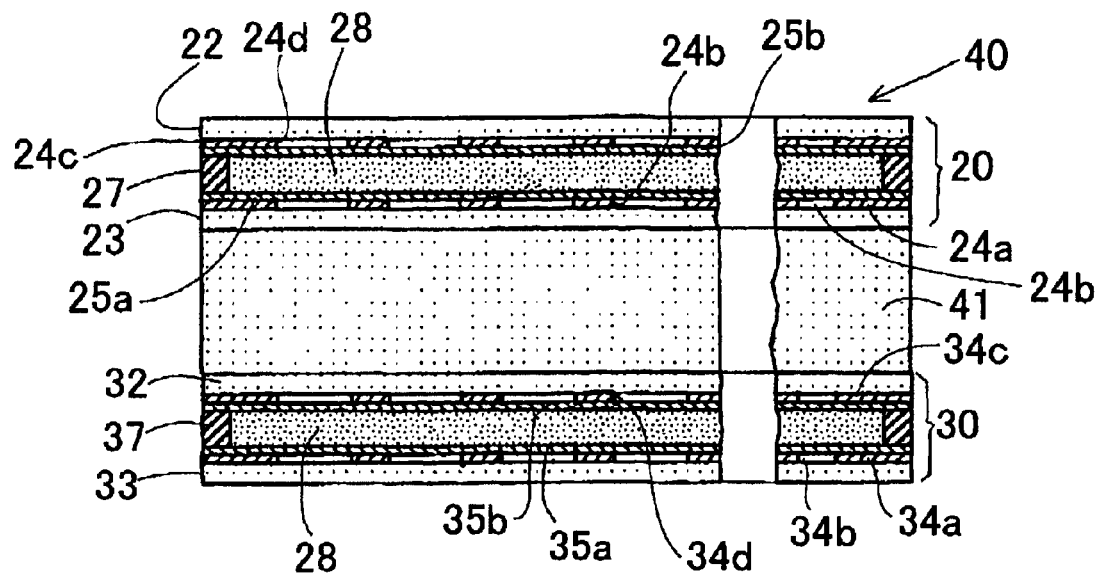
FIG. 1 is a sectional view of a compound liquid crystal microlens according to a first embodiment of the present invention.

A first embodiment of a compound liquid crystal microlens is described hereinafter with reference to FIGS. 1 and 2. FIG. 1 is a sectional view showing the compound liquid crystal microlens for a contact-type sensor, and FIG. 2 is a perspective view of an electrode used in the microlens of FIG. 1.

Figure 2:
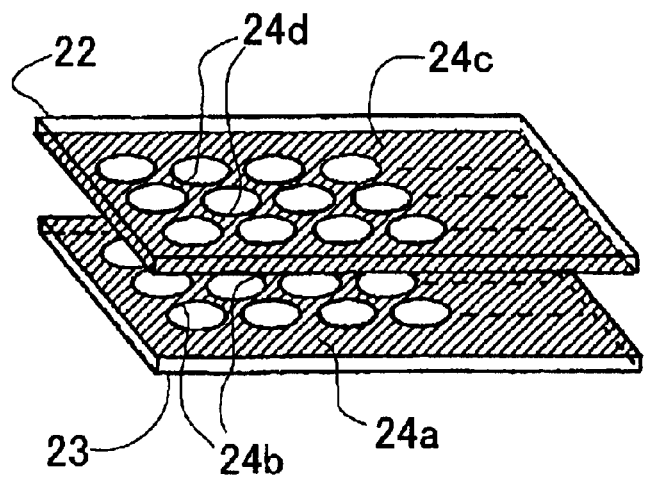
FIG. 2 is a perspective view showing electrodes used in the compound liquid crystal microlens of FIG. 1.

Referring to FIGS. 1 and 2, a compound liquid crystal microlens 40 for a contact-type sensor comprises a first nematic liquid crystal cell 20 as a first liquid crystal lens, second nematic liquid crystal cell 30 as a second liquid crystal lens, and a intermediate transparent glass plate 41 interposed between the first and second liquid crystal cells 20 and 30.

The first nematic liquid crystal cell 20 comprises a lower transparent glass substrate 23, an upper transparent glass substrate 22, a pattern electrode 24a on the lower transparent glass substrate 23, a pattern electrode 24c on the upper transparent glass substrate 22, a transparent alignment layer 25a on the electrode 24a, a transparent alignment layer 25b on the electrode 24c and an enclosing member 27 provided between alignment layers 25a and 25b. The pattern electrode 24a is formed by a conductive electrode film and has a plurality of circular holes 24b, and the pattern electrode 24c is also formed by a conductive electrode film and has a plurality of circular holes 24d. Each of the circular holes 24d is concentrically formed with an opposite hole 24b. A liquid crystal material 28 is injected into a space defined by the enclosing member 27 and the alignment layers 25a and 25b. The alignment layers 25a and 25b are rubbed so that the alignment of each layer is antiparallel and homogenous to one another. In the present embodiment, the pattern electrodes 24a and 24c need not be transparent. The pattern electrodes 24a and 24c are so disposed that the holes 24b and the holes 24d coincide.

Similarly, the second liquid crystal cell 30 comprises a lower transparent glass substrate 33, a pattern electrode 34a having a plurality of circular holes 34b, and an alignment layer 35a applied on the electrode 34a, and an enclosing member 37 on the peripheral portion of the alignment layer 35a. An upper transparent glass substrate 32, on which a pattern electrode 34c having a plurality of circular holes 34d, each of which is concentric with the hole 34b, and an alignment layer 35b are mounted on the enclosing member 37. A pair of holes 34b and 34d is concentric with a pair of opposite holes 24b band 24d. The liquid crystal material 28 is injected into a space defined by the enclosing member 37 and the alignment layers 35a and 35b. The alignment layers 35a and 35b are rubbed so that the alignment of each layer is antiparallel and homogenous to one another. The lower glass 23 of the first liquid crystal cell 20 and the upper glass 32 of the second liquid crystal cell are adhered to each other interposing the intermediate glass plate 41, thereby forming the microlens 40. The holes 24b, 24d of the first cell 20 and the holes 34b and 34d of the second cell 30 are adapted to coincide with each other.

Figure 3A:
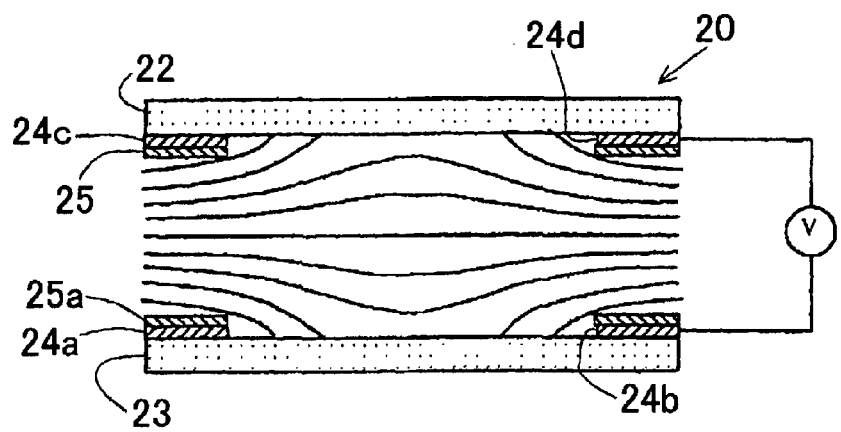
FIGS. 3a to 3c are diagrams showing an electric potential distribution in the liquid crystal cell of FIG. 2.
Figure 4:
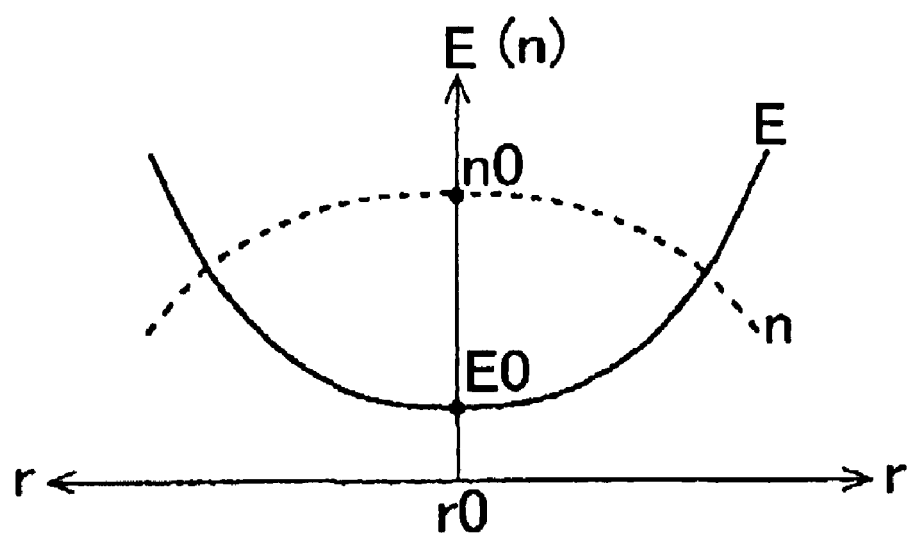
FIG. 4 is a graph showing a relationship between electric field intensity and refractive index in the liquid crystal cell.

When the first liquid crystal cell 20 is applied with a voltage, electric potentials are distributed as shown by contour lines in FIG. 3a. Here, the electric field intensity is in inverse proportion to the interval between the contour lines. As shown in FIG. 4, the electric field intensity E of the first liquid crystal cell 20 has such a spatial distribution as to be increased as the distance r from a center r0 of the hole 24b (24d) of the pattern electrode 24a (24c) increases in the radial direction. The intensity E0 shown in FIG. 4 is the intensity at the center of the hole 24b.

Figure 3B:
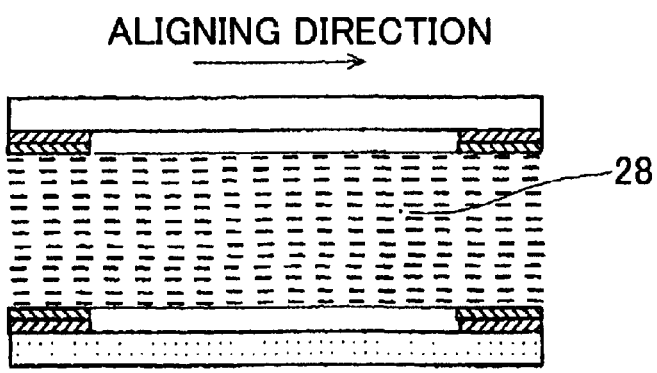

Explaining the direction of a director of the liquid crystal material 28, when the applied voltage is zero, the director is horizontal, parallel to the rubbing direction as shown in FIG. 3b. When a voltage is applied, the inclination of the director increases as shown in FIG. 3c in accordance with the electric field intensity.

Figure 3C:
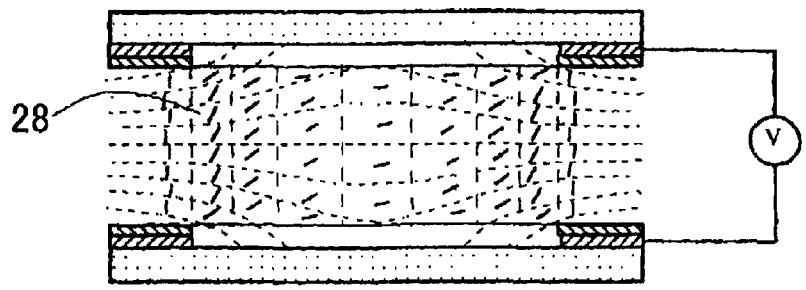

In FIG. 3c, a section of the liquid crystal material 28 is divided into a plurality of regions by the contour lines and the vertical division lines, and a typical director is shown for each region. As shown in the drawings, where the interval between the contour lines is small and the electric field intensity is large, the inclination is increased toward the perpendicular direction. With the increase of inclination, a refractive index n in the perpendicular direction decreases. As a result, as shown in FIG. 4, the refractive index quadratically decreases in accordance with the increase of the distance r. A refractive index n0 in the graph is that at the center of the hole 24b. The first and second liquid crystal cells 20 and 30 each has such a characteristic with regard to the refractive index n.

Figure 5A:
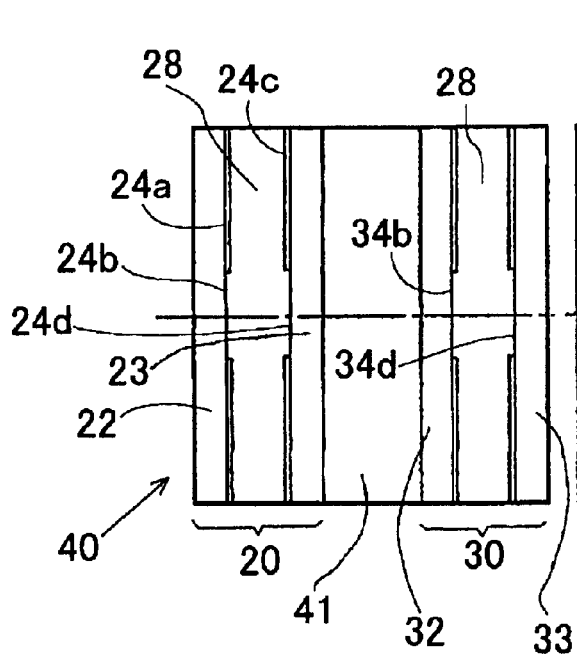
FIGS. 5a to FIG. 5c are diagrams showing the dimensions in the liquid crystal cell.
Figure 5B:
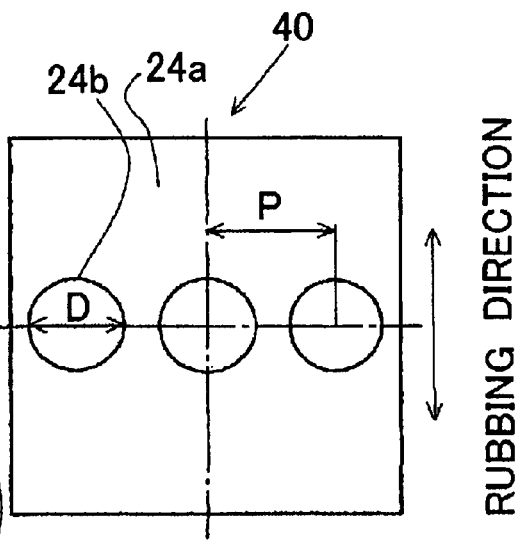

The compound liquid crystal microlens 40 of the first embodiment will now be described hereinafter with reference to FIGS. 5a to 5b where the specific dimensions thereof are shown. As shown in FIG. 5a, the upper and lower glasses 22, 23 of the first liquid crystal cell 20, and the upper and lower glasses 32, 33 of the second liquid crystal cell 30 each has a thickness of 1.1 mm including the electrode film and the alignment layer. The thickness of the liquid crystal layer consisting of the liquid crystal material 28 is 0.11 mm and the thickness of the intermediate glass plate 41 is 3.3 mm. As shown in FIG. 5b, the holes 24b, 24d, 34b, 34d of the electrodes 24a, 24c, 34a, 34c, respectively, each has a diameter D of 0.22 mm, and the interval P between the holes is 0.293 mm. As shown in FIG. 5a, holes 24b, 24d, 34b and 34d are concentrically formed. The rubbing direction of the aligning layers is shown by the arrow in FIG. 5b.

Figure 6:
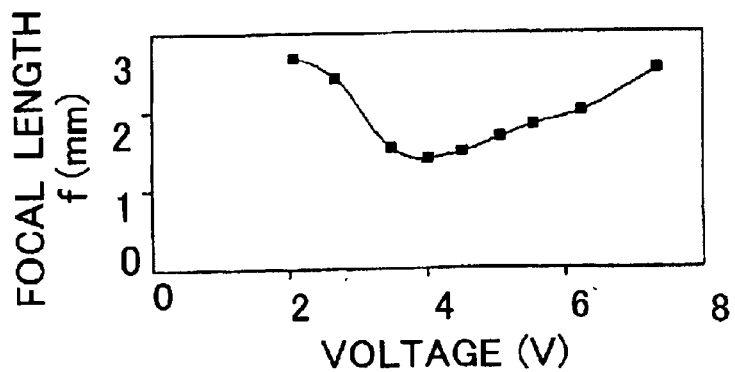
FIG. 6 is a graph showing a relationship between focal length and applied voltage in the liquid crystal cell.

The characteristic at forming of an image in the first liquid crystal cell 20 when used singularly is described. As has been already described, the distribution of the refractive index occurs when a voltage is applied to the electrodes 24a and 24c. The distribution varies in accordance with the applied voltage so that a focal length f of the first liquid crystal cell 20 changes as shown in FIG. 6. When a voltage of 4 V is applied, a minimum focal length f of 1.4 mm is stably provided in the first liquid crystal cell 20.

Figure 7:
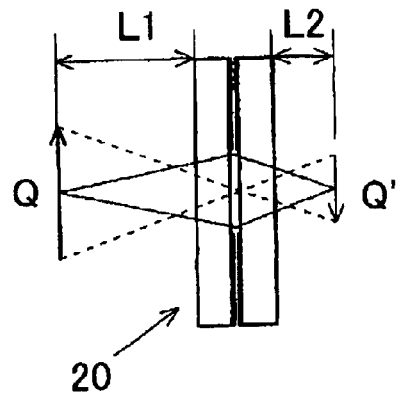
FIG. 7 is a diagram describing the operation of the liquid crystal cell.
Figure 8:
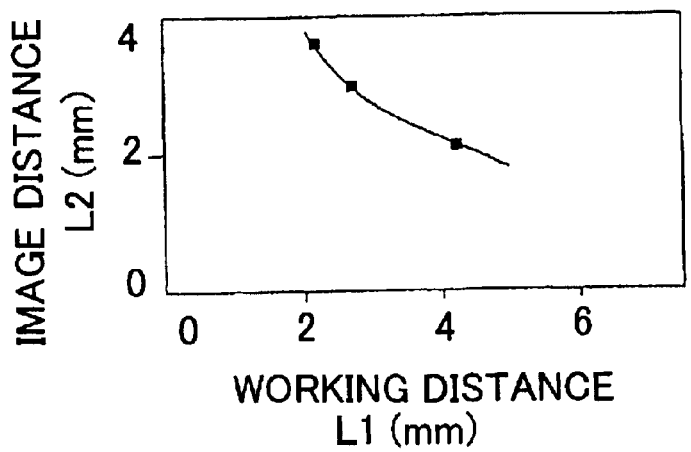
FIG. 8 is a graph showing a relationship between working distance and image distance in the liquid crystal cell.

Referring to FIG. 7, showing the operation of the first liquid crystal cell 20, an object Q which is positioned a working distance L1 away from the liquid crystal cell is inverted to form an image Q' at a image distance L2 opposite the cell 20. FIG. 8 shows the change of the image distance L2 with the change of the working distance L1 in the liquid crystal cell having the minimum focal length of 1.4 mm. Namely, when the working distance L1 sufficiently exceeds the focal length, the image distance L2 decreases in accordance with the increase of the working distance L1. On the other hand, measurement results have shown that the proportion of the size of the formed image Q' to the original object Q, that is, an image magnification m is always L2/L1. Therefore, if a suitable working distance L1 is selected, a desired magnification m can be obtained in a certain range.

Figure 9:
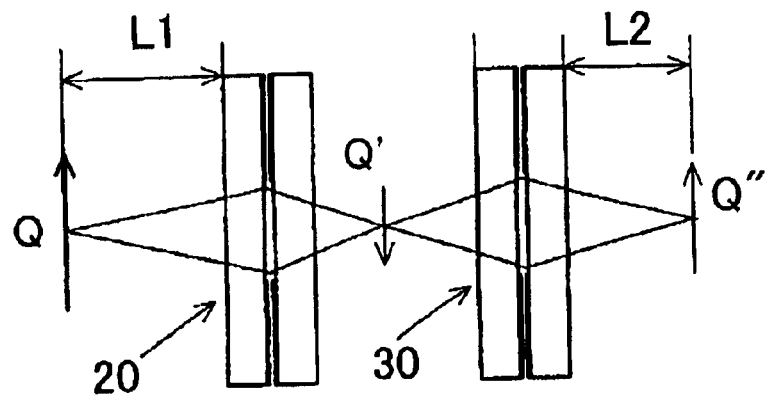
FIG. 9 is a diagram describing the operation when two liquid crystal cells are assembled.

The second liquid crystal cell 30 having the same size and the same focal length is assembled therewith to form a compound liquid crystal microlens 40 where the above described principle can be said of each of the cells. As shown in FIG. 9, the first liquid crystal cell 20 and the second liquid crystal cell 30 are disposed in axial symmetry. The inverted image Q' of the object Q formed by the first liquid crystal cell 20 is further inverted by the second liquid crystal cell 30 at the image distance L2, resulting in an erecting image Q". In accordance with the above described principle, the position of the inverted image Q' of the size same as that of the object Q changes with the change of the working distance L1, and furthermore, so does the image distance L2. The measurement results has shown that the proportion of the size of the erecting image Q" to the original object Q, that is the final image magnification M is substantially L2/L1. Hence by setting an appropriate working distance L1 so that L1=L2=L0 (FIG. 5c), the image magnification M becomes 1. Such a conjugating relation between the liquid crystal cells renders it possible to provide the erecting image Q" of the same size as the object Q.

Figure 5C:
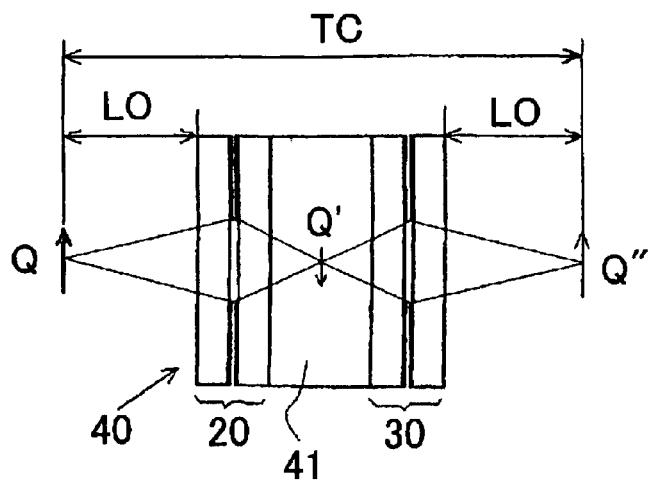
Figure 16A:
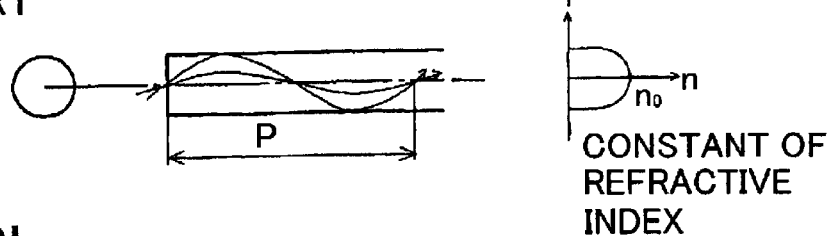
FIGS. 16a to 16c are diagrams explaining the operating principle of the rod lens array.
Figure 16B:
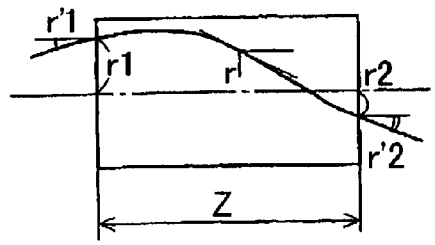
Figure 16C:
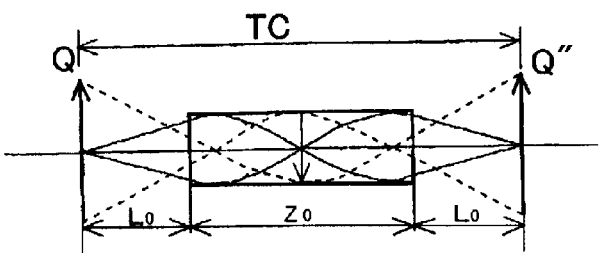
Figure 17:
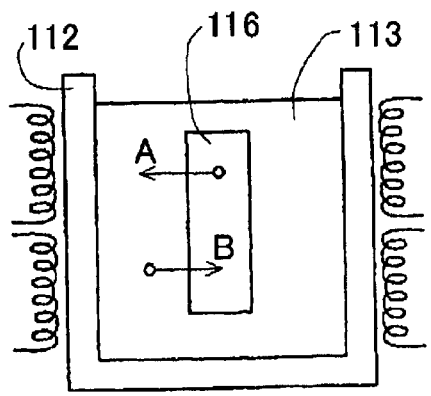
FIG. 17 is a diagram describing the ion exchange method of the rod lens array for imparting a refractive index distribution.

FIG. 5c describes the operation for forming the erecting image Q" of the same size in the compound liquid crystal microlens 40 having the dimensions shown in FIGS. 5a and 5b. In the example, the working distance L0 is 6.5 mm. The compound liquid crystal microlens 40 of the present embodiment provides a consecutive erecting image of the same size as the scanned object in the same manner as the conventional rod lens array 106 shown in FIG. 16.

The working distance L0 can be arbitrarily set by selecting an arbitrary thickness of the intermediate glass plate 41. When an appropriate TC length or conjugating length, which is a distance between the original object and the produced image, is set, not only can the text sheet be easily illuminated, the scanning range on the sheet and the image-forming range at the light receiving elements can be sufficiently enlarged. More particularly, when the working distance is too short, the text sheet and the compound liquid crystal microlens are too close to each other in the contact-type sensor so that the text sheet cannot be sufficiently illuminated. Even if the sheet is illuminated, the depth of focus becomes too shallow thereby blurring the formed image. Thus it becomes necessary to set an appropriate working distance as in the present embodiment. Since the TC length can be changed by changing the working distance L0, the TC length is controlled by changing the thickness of the intermediate glass plate 41. However, the TC length can also be controlled by changing the focal distances of each liquid crystal cells 20 and 30. The TC length tends to be shorter when the focal distance becomes shorter.

Figure 10:
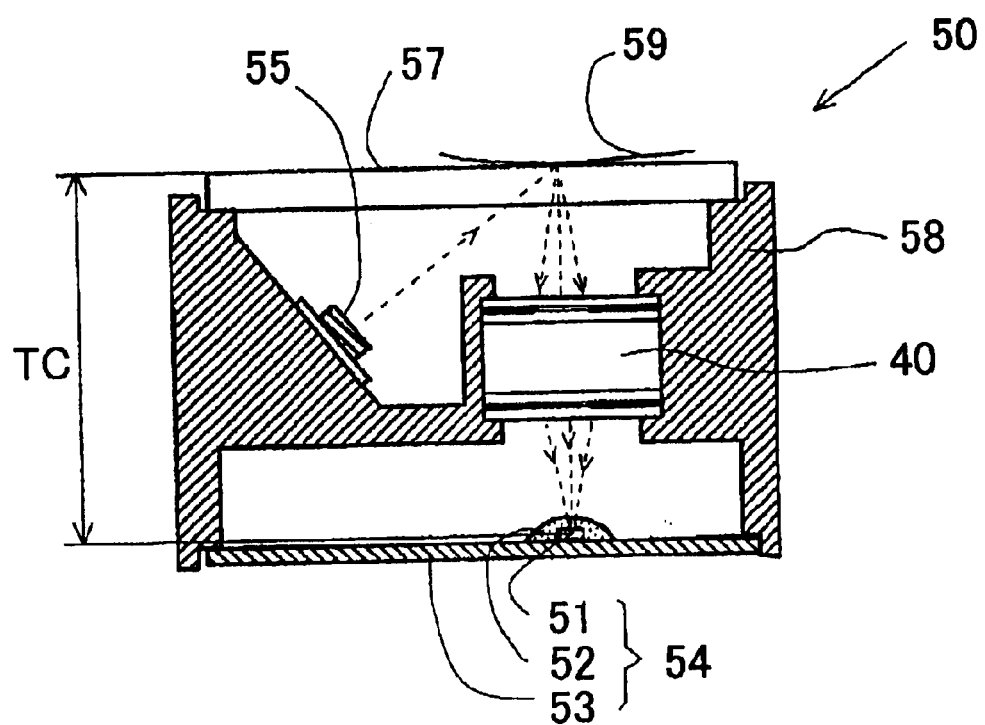
FIG. 10 is an illustration of a contact-type sensor in which the compound liquid crystal microlens of the present invention is employed.

Referring to FIG. 10 showing a contact-type sensor 50 in which the compound liquid crystal microlens 40 is assembled instead of the conventional rod lens array, the sensor 50 has a frame 58 in which are mounted a linear LED array 55 and light-receiving element array 54. The light-receiving element array 54 comprises a substrate 53 formed on the bottom of the frame 58, a protection film 52 mounted on the substrate 53, and a sensor IC 51 comprising a plurality of photoelectric converters. A transparent plate 57 on which a text sheet 59 is set is mounted on the upper portion of the frame 58. The compound liquid crystal microlens 40 is mounted in the middle portion of the frame 58 between the transparent plate 57 and the light-receiving element array 54.

Figure 11:
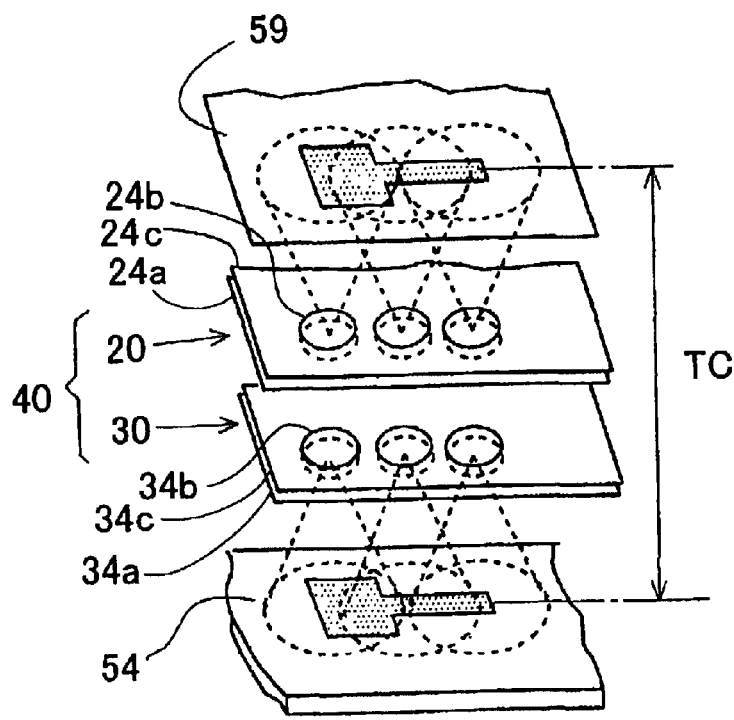
FIG. 11 is a diagram describing the operation of the compound liquid crystal microlens in the sensor of FIG. 10.

FIG. 11 in which the glass substrate and others are omitted shows the operation of the compound liquid crystal microlens. As shown in the FIG. 11, the compound liquid crystal microlens 40 comprises a plurality of microlenses each having a diameter as that of the holes 24b, 24d, 34b and 34d. In operation, a light beam from the LED array 55 irradiates the text sheet 59. The light beams diffused and reflected at a particular reading line of the sheet 59 passes through each set of holes 24b, 24d, 34b and 34d and the liquid crystal material 28 so as to form images on the array of sensor of the light-receiving element array 54. Information regarding the shades of the text sheet conveyed by the reflected light, taking the form of the strength of the light, is converted into an electric signal by the sensor and serially outputted in accordance with the scanning direction. After scanning one line in the scanning direction, the next line in the direction perpendicular to the scanning direction is scanned. By repeating the scanning, the two-dimensional image information on the text sheet 59 is converted into an electric signal in time sequence.

Since a region on the text sheet 59 which can be read through each set of coinciding holes 24b, 24d, 34b and 34d is considerably larger than the diameter thereof so that the regions read through the adjacent holes overlap. As a result, consecutive and overlapping images can be formed on the sensor IC 51 of the light receiving element array 54, thereby enabling to form an erecting image of the equal size as the object on the text sheet 59.

Figure 12:
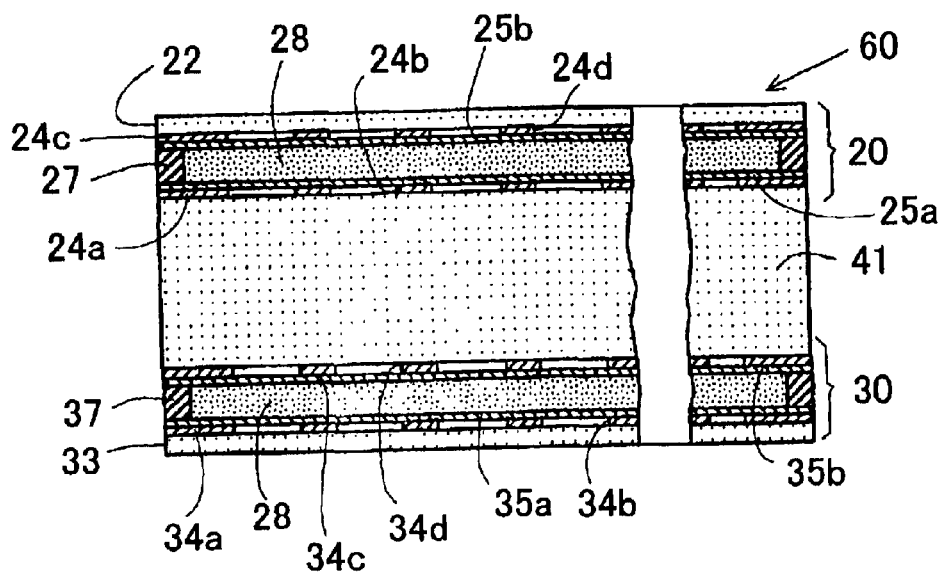
FIG. 12 is a sectional view of a compound liquid crystal microlens according to a second embodiment of the present invention.

Referring to FIG. 12, in a compound liquid crystal microlens 60 of the second embodiment of the present invention, the lower glass substrate 23 of the first liquid crystal cell 20 and the upper glass substrate 32 of the second crystal cell 30 of the first embodiment are obviated and the intermediate glass plate 41 serves as the substrates 23 and 32. Namely, the pattern electrode 24a and the alignment layer 25a are formed on the upper surface of the intermediate glass plate 41 and the pattern electrode 34c and the alignment layer 35b are formed on the lower surface of the glass plate 41. The thickness of the microlens 60 as a whole is the same as that of the microlens 40 of the first embodiment and the optical characteristics are also the same.

Since the first and second liquid crystal cells 20 and 30 are initially integrally formed, not only can the manufacturing process of adhering the intermediate glass plate 41 to the liquid crystal cells be obviated, the optical axes of the first and second liquid crystal cells 20 and 30 can be accurately aligned when mounting the pattern electrodes 24a and 34c on the glass plate 41.

Figure 13A:
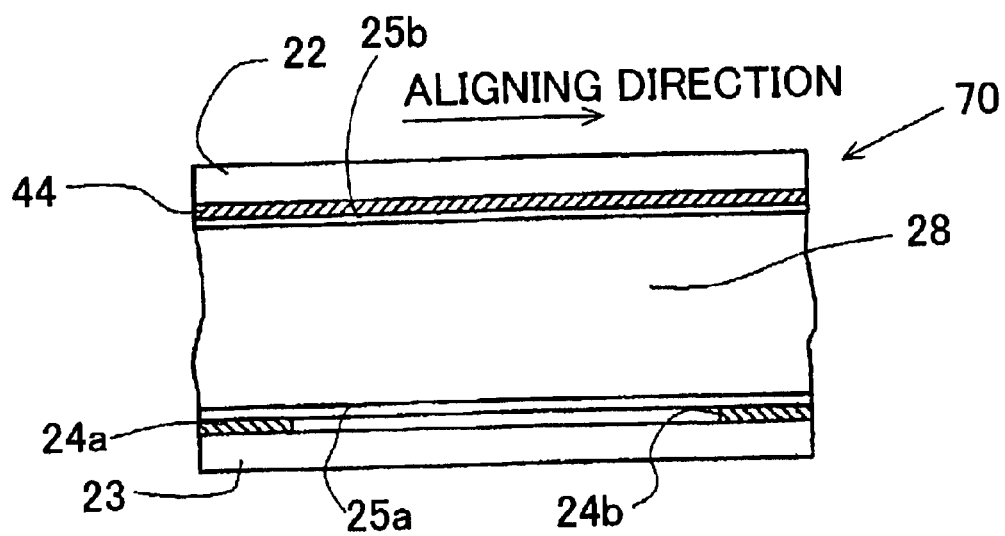
FIG. 13a is sectional view of a liquid crystal cell in a compound liquid crystal microlens of a third embodiment of the present invention.
Figure 13B:
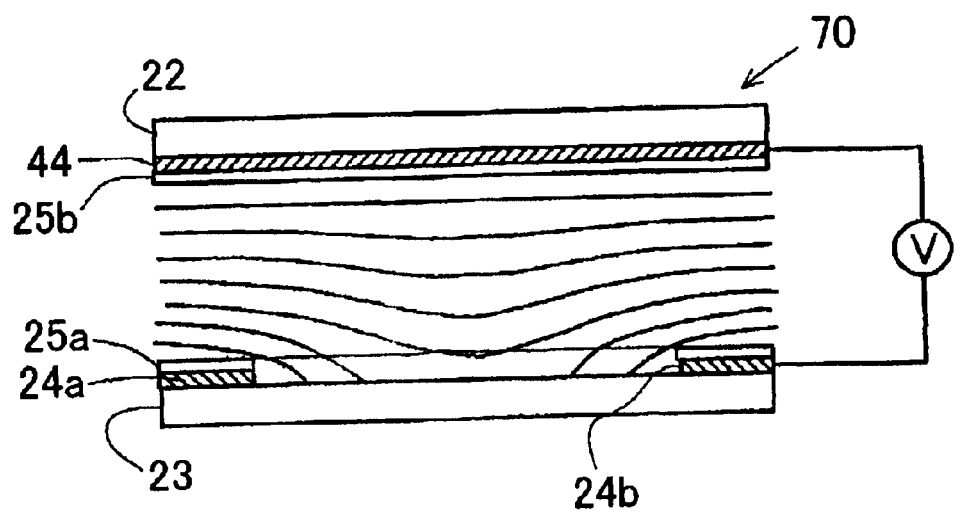
Figure 14:
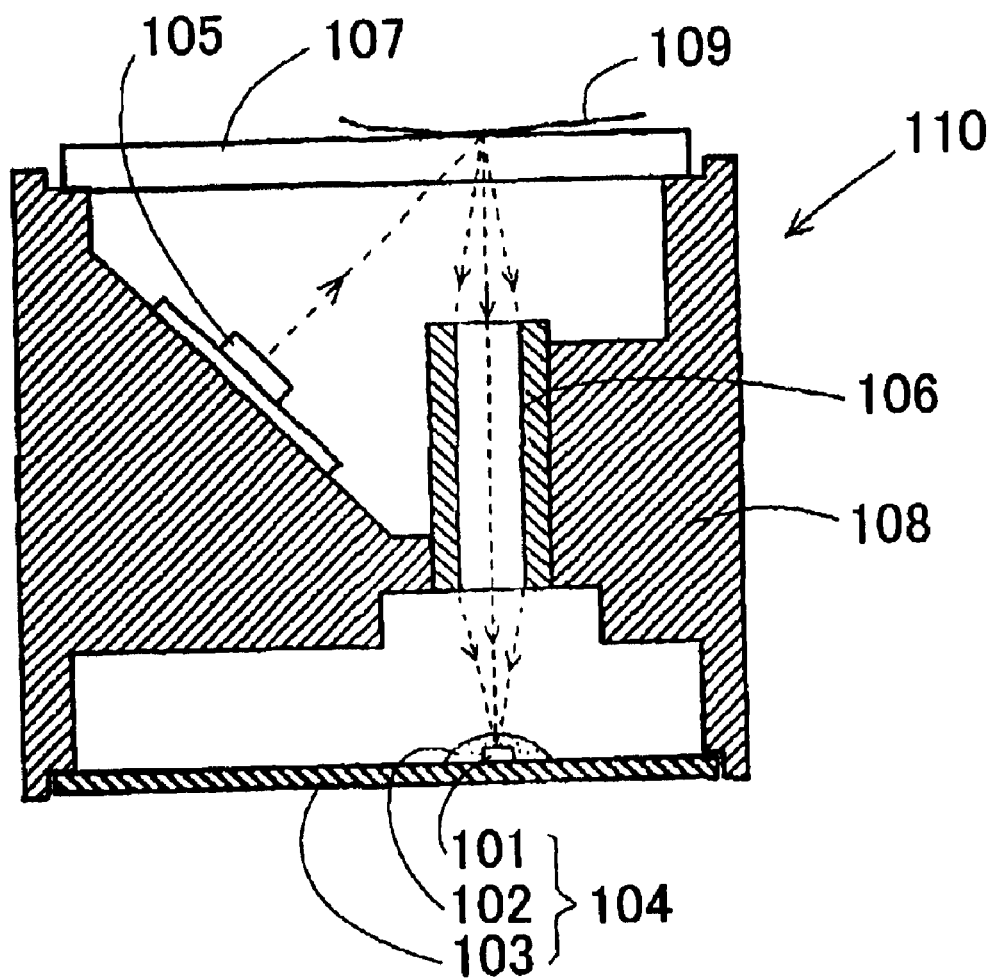
FIG. 14 is an illustration of a conventional contact-type sensor.
Figure 15:
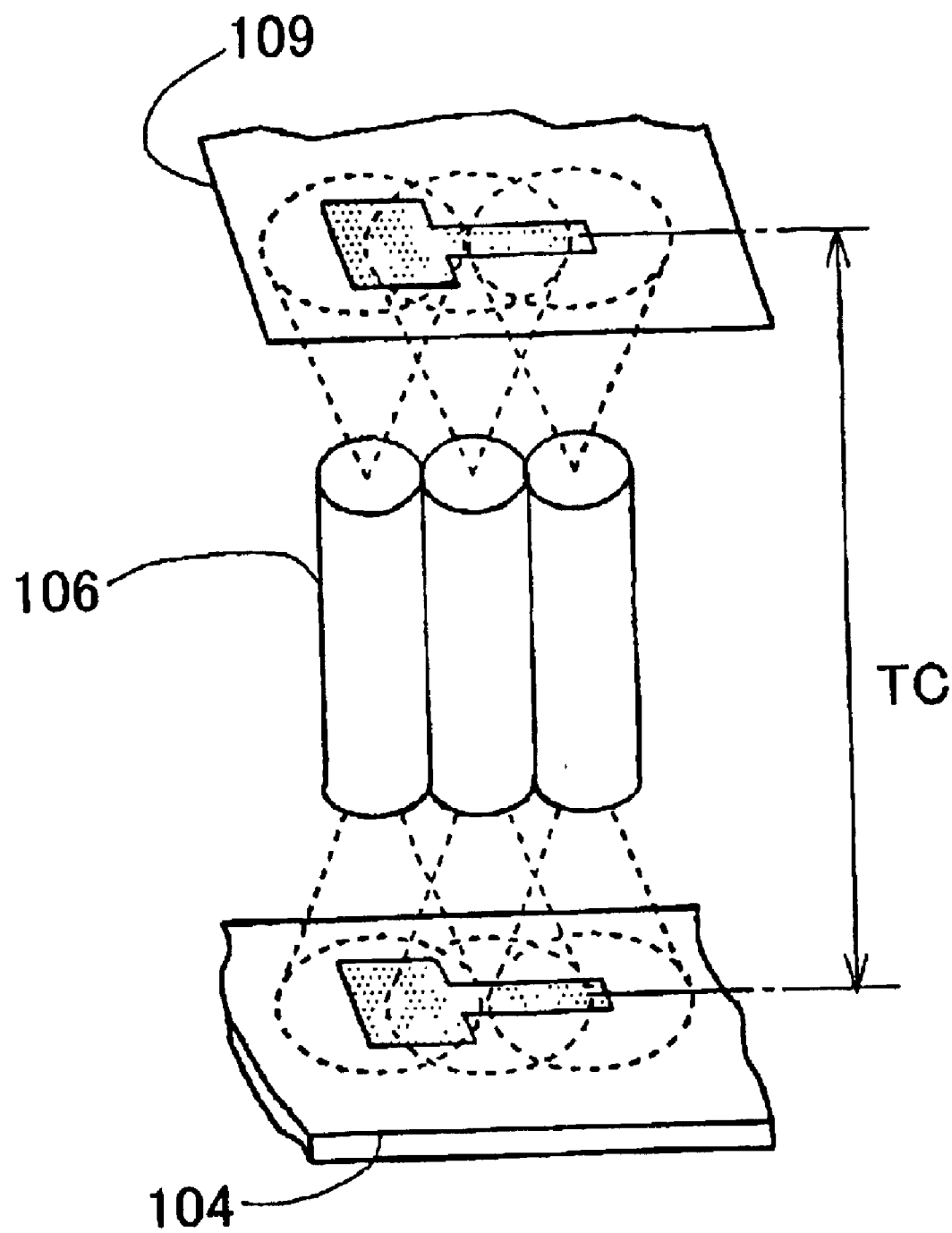
FIG. 15 is a diagram describing the operation of a rod lens array employed in the conventional sensor of FIG. 14.

FIGS. 13a and 13b show a liquid crystal cell 70 used in a compound liquid crystal microlens of the third embodiment of the present invention. Referring to FIG. 13a, whereas the pattern electrode 24 having a plurality of holes 24b is formed on the lower substrate 23 as in the first embodiment, a transparent electrode 44 is formed on the underside of the upper substrate 22. Other constructions are the same as those of the first embodiment.

When the electrodes 24a and 44 are applied with voltage, there is generated a distribution of potential as shown by the contour lines in FIG. 13b. More particularly, the electric field becomes more intense as it becomes distant from the center of the hole 24b in the radial direction thereof, thereby forming a refractive index distribution similar to that shown in FIG. 4. The liquid crystal cells 70 are assembled to form a compound liquid crystal lens which is similar to the compound liquid crystal lens 40 of the first embodiment.

The compound liquid crystal lens of the present invention has the following advantages over the conventional rod lens array.

(1) An inexpensive and compact lens array can be constructed. More particularly, although the rod lens array becomes expensive as afore-described, in the compound liquid crystal microlens, a lens array comprising a plurality of liquid crystal lenses can be simultaneously manufactured in one liquid crystal cell by the same process as an ordinary liquid crystal cell at a low cost. Moreover, in the rod lens array, the diameter of the lens cannot be largely decreased because the refractive index must be generated by the ion exchange method. To the contrary, in the compound liquid crystal microlens, the holes of the pattern electrodes in the size of several ten microns can be easily formed by etching so that the diameter of the lens can be decreased.

In addition, in the case of the rod lens array, the length of the lens is restricted by the winding interval of light so that the length cannot be sufficiently shortened. However, the thickness of the liquid crystal may be several ten micrometers so that an arbitrary thickness of the intermediate glass plate 41 may be selected insofar as the working distance L0 permits, thereby allowing the length of the lens to be largely decreased.

(2) The TC length of the rod lens array can only be chosen from the lineup of the products, so that it is not possible to decrease the TC length to manufacture a thin contact-type sensor. However, the compound liquid crystal microlens renders it possible to form a lens of an arbitrary TC length so that a thin contact-type sensor may be manufactured.

(3) Since a smaller lens diameter can be provided in the compound liquid crystal microlens of the present invention than the conventional rod lens array, when a suitable working distance is obtained, the focusing depth is increased, thereby improving a resolution of the image. Moreover, since the density of the lens is increased under such a circumstance, the brightness of the image is not deteriorated.

While the invention has been described in conjunction with preferred specific embodiment thereof, it will be understood that this description is intended to illustrate and not limit the scope of the invention, which is defined by the following claims.

What is claimed is:

1. A compound liquid crystal lens comprising:

a first liquid crystal lens for forming an inverted image of an object;

a second liquid crystal lens for inverting the inverted image, thereby forming an erecting image of the object; and a transparent glass plate disposed between the first and second liquid crystal lenses for supporting the first and second liquid crystal lenses in axial symmetry;

wherein each of the first and second liquid crystal lenses comprises a pair of spaced transparent substrates, a pair of electrodes disposed between the substrates, a pair of alignment layers provided on the electrodes, and a liquid crystal material charged in a space between the substrates, at least one of the electrodes of each lens having a plurality of laterally spaced, circular holes therein, with opposite circular holes of the first and second liquid crystal lenses being concentrically disposed to form a microlens.

2. A compound liquid crystal lens comprising:

a first liquid crystal lens for forming an inverted image of an object;

a second liquid crystal lens for inverting the inverted image, thereby forming an erecting image of the object; and a transparent glass plate provided between the first and second liquid crystal lenses;

wherein each of the first and second liquid crystal lenses comprises a transparent substrate, a pair of electrodes disposed in a space between the substrate and the glass plate, a liquid crystal material charged in a space between the electrodes, both of the electrodes having a plurality of laterally spaced, opposite circular holes, opposite circular holes of the first and second liquid crystal lenses being concentrically disposed.

* * * * *